United States Patent
Lee et al.

(10) Patent No.: US 6,798,823 B1
(45) Date of Patent: Sep. 28, 2004

(54) PARALLEL DISTRIBUTED SAMPLE ACQUISITION SYSTEM AND SIGNAL ACQUISITION METHOD USING THE SAME

(75) Inventors: Byeong Gi Lee, Seoul (KR); Byoung Hoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 611 days.

(21) Appl. No.: 09/694,029

(22) Filed: Oct. 23, 2000

(30) Foreign Application Priority Data

Nov. 12, 1999 (KR) ........................................ 1999-50341

(51) Int. Cl.[7] .............................................. H04B 1/69
(52) U.S. Cl. ...................... 375/130; 375/141; 375/146
(58) Field of Search ................................. 375/141, 316, 375/200, 130, 206; 370/335

(56) References Cited

U.S. PATENT DOCUMENTS

| | | | | |
|---|---|---|---|---|
| 4,377 A | * | 2/1846 | Lee et al. .................... | 126/1 E |
| 5,644,591 A | * | 7/1997 | Sutton ......................... | 375/142 |
| 5,818,868 A | * | 10/1998 | Gaudenzi et al. ........... | 375/152 |
| 6,263,011 B1 | * | 7/2001 | Paik et al. ................... | 375/149 |
| 6,385,180 B1 | * | 5/2002 | Maru ........................... | 370/335 |
| 6,389,058 B1 | * | 5/2002 | Lee et al. .................... | 375/141 |

OTHER PUBLICATIONS

Block et al., Parallel Acquisition of Multicarrier Direct–Sequence Spread–Spectrum Signals, IEEE, 2/99, pp. 97–102.*
Kim et al. Parallel DSA for Fast Acquisition in M–ary DS/CDMA Systems, Communications 1999, vol. 1, Oct. 18–22, 1999, pp. 727–729.*
Kim et al., A fast DS/CDMA acquisition scheme based on igniter sequence and distributed samples Communications, 1998. ICC 98. Conference Record. 1998 IEEE International Conference on, vol.: 3, Jun. 7–11, 1998 pp.: 1259–1263.*
Rick, R.R.; Milstein, L.B.; Communications, 1994. ICC 94, SUPERCOMM/ICC '94, Conference Record, Serving Humanity Through Communications. IEEE International Conference on, May 1–5, 1994 pp.: 1422–1426 vol. 3.*

* cited by examiner

Primary Examiner—Stephen Chin
Assistant Examiner—Cicely Ware
(74) Attorney, Agent, or Firm—Fleshner & Kim LLP

(57) ABSTRACT

A parallel distributed sample acquisition system is disclosed. It is capable of carrying out parallel distributed sample acquisition employing M-ary signaling for fast synchronization of a diffusion band signal and a signal acquisition method using the same. The system includes a transmitter for taking at least one or more first state samples at the same time from a first main sequence for data spreading and spreading the first state sample to an M-ary symbol state signal, thereby transmitting the state signal, and a receiver for detecting the first state sample from the transmitted state signal, comparing the first state sample detected with a second state sample taken from a second main sequence for data despreading, and correcting the state of the second main sequence in accordance with the compared result, thereby enabling the synchronizing to the first main sequence.

26 Claims, 14 Drawing Sheets

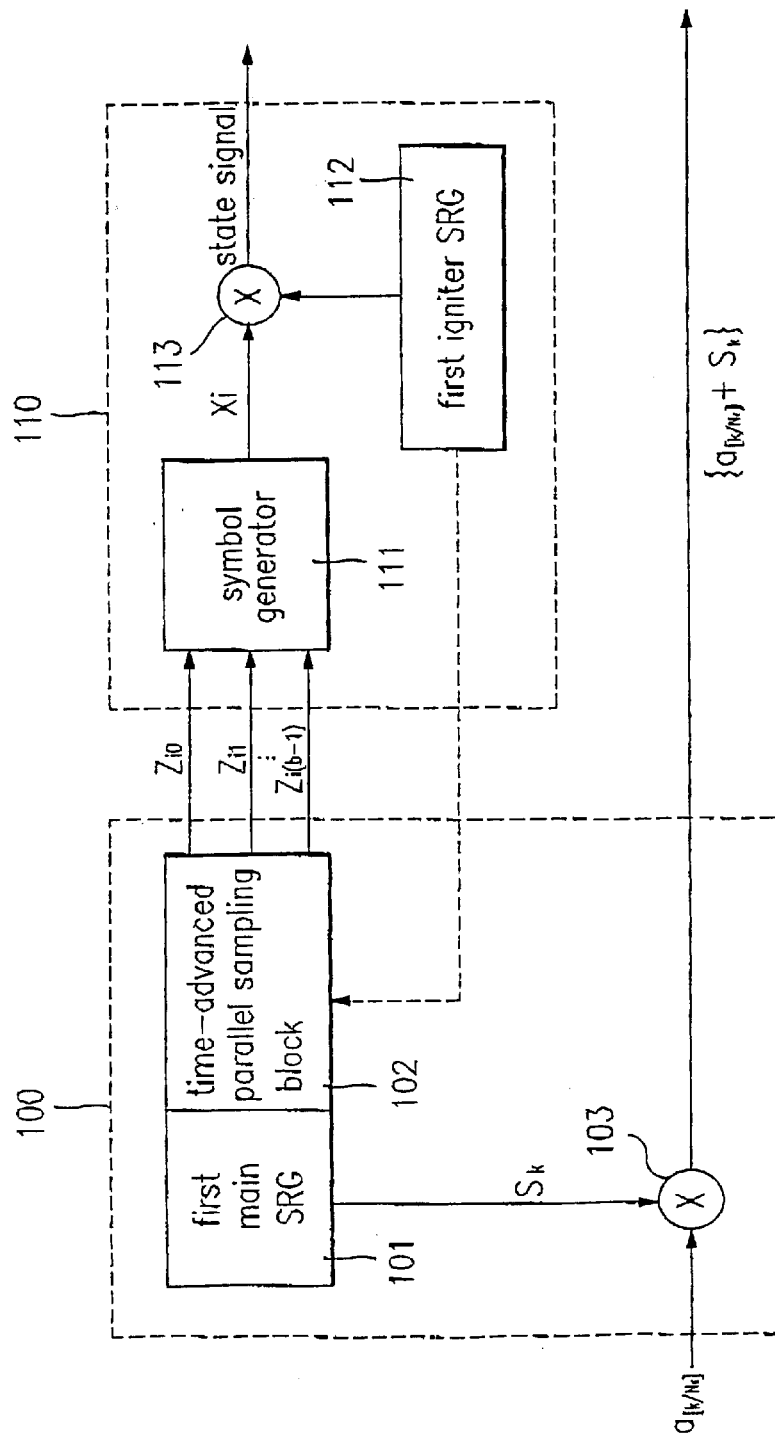

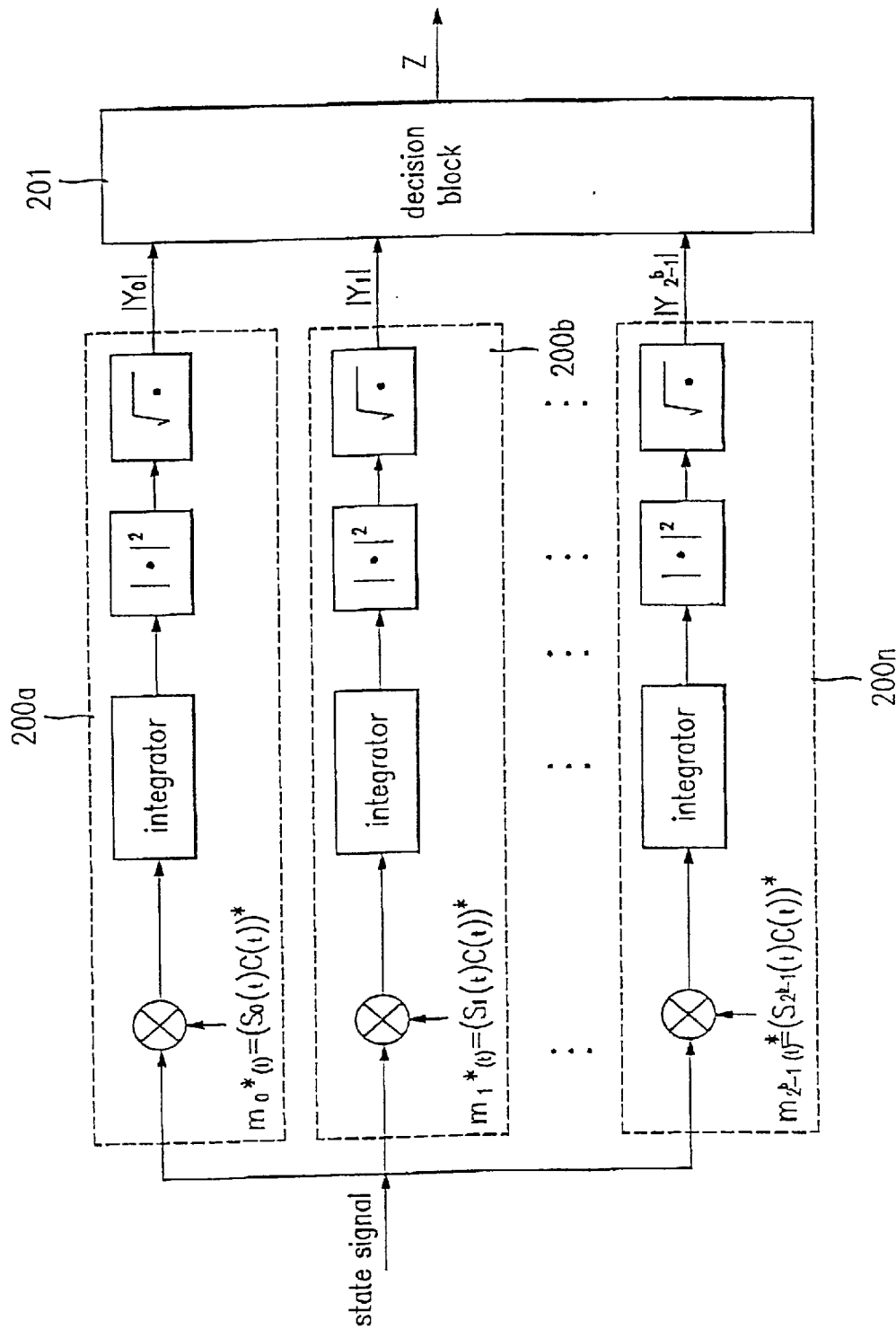

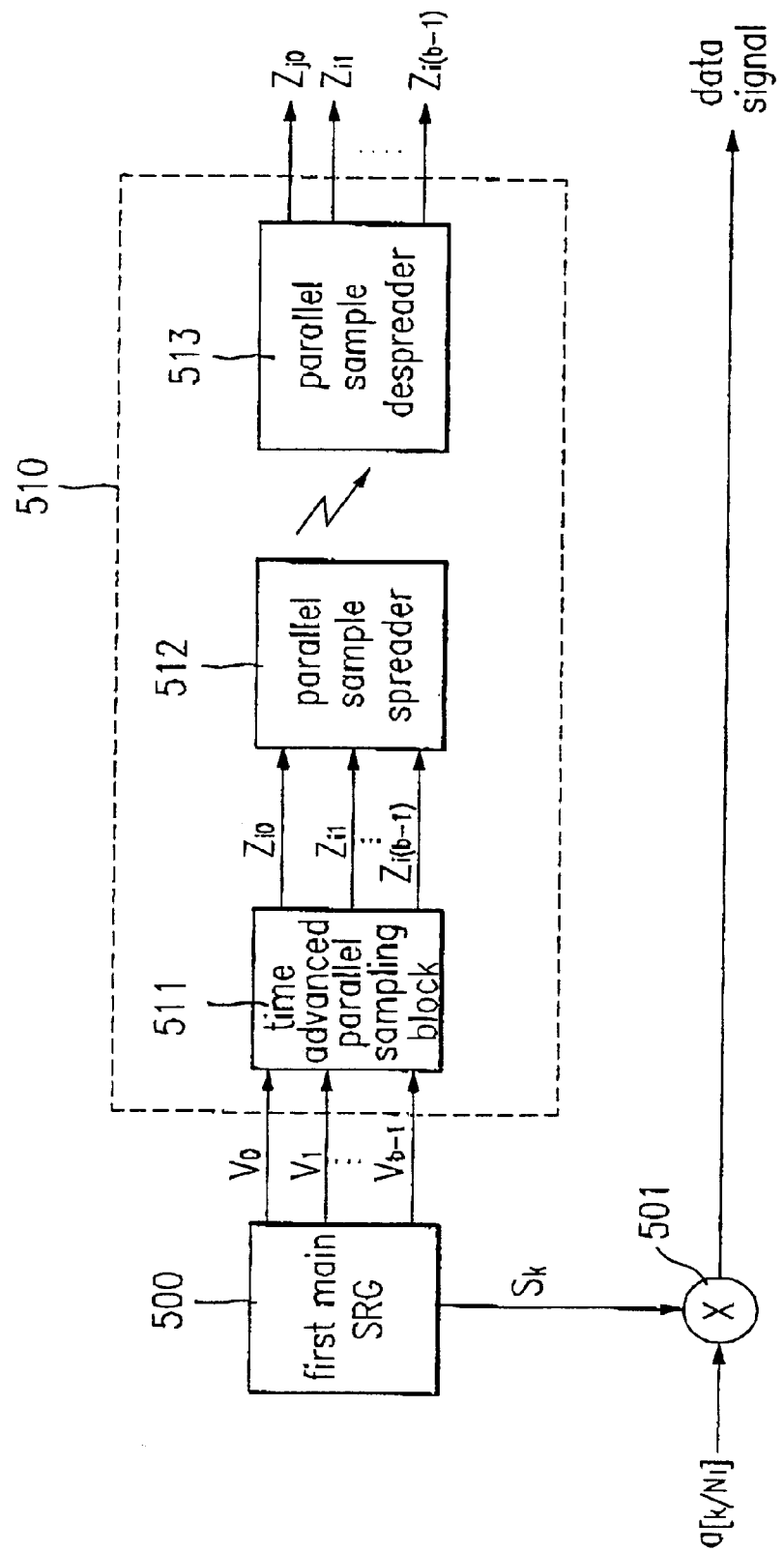

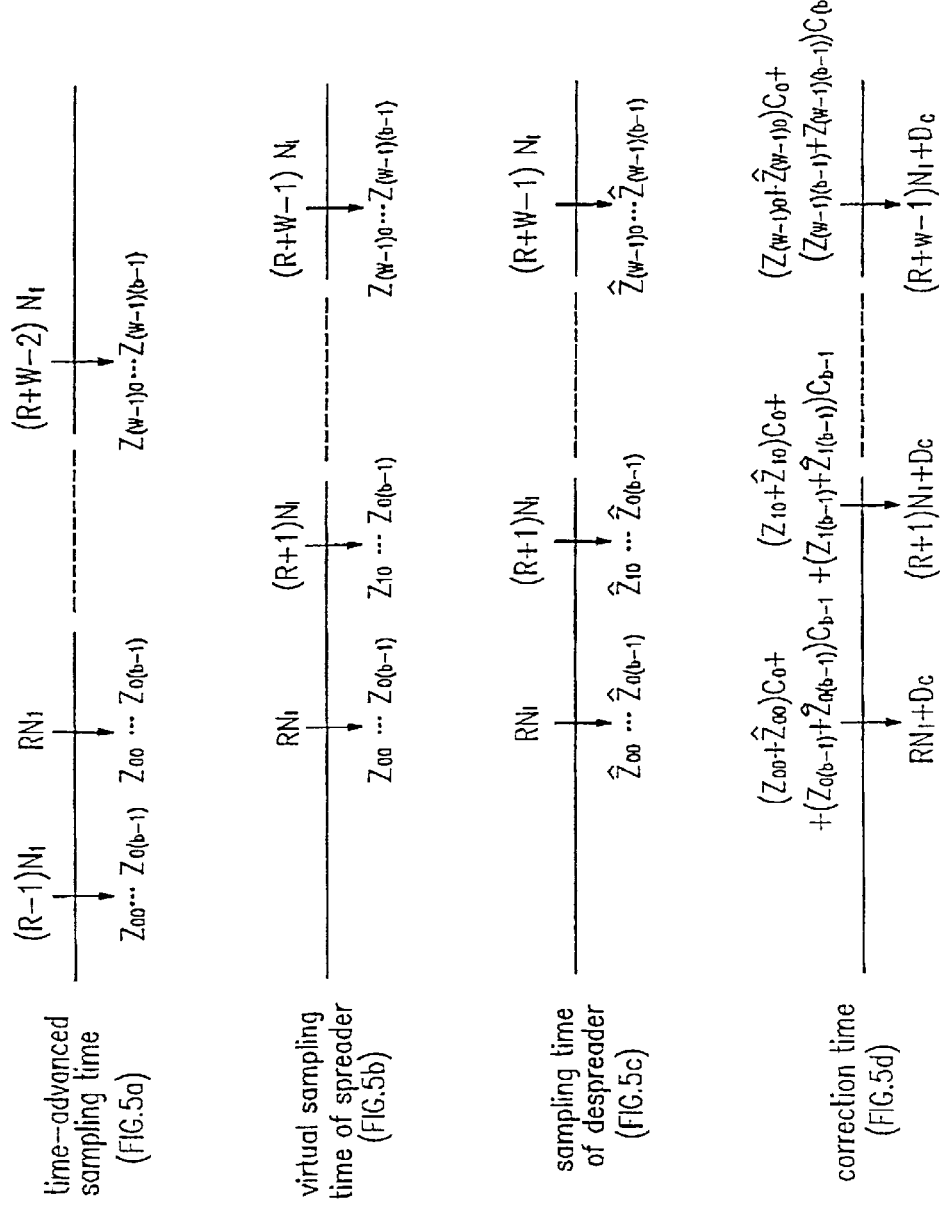

PARALLEL DISTRIBUTED SAMPLE ACQUISITION SYSTEM AND SIGNAL ACQUISITION METHOD USING THE SAME

BACKGROUND OF THE INVENTION

1. Field of the Invention

The present invention relates to mobile radio communication, and more particularly to a parallel distributed sample acquisition (PDSA) system for a mobile radio communication system.

2. Background of the Related Art

The distributed sample acquisition (DSA) technique, recently presented for fast acquisition of long-period PN sequences, substantially outperforms the existing serial search acquisition (SSA) techniques, in DS/CDMA system-based mobile radio communication systems. The DSA technique exhibited more than 100 times faster acquisition for the longer period PN sequences when applied to the IS-95 specification. Thus, since the period of the PN sequences is long, the acquisition time performance can be reduced over that of the SSA technique.

Features of the DSA technique are given as follows. First, a transmitter takes state samples for a main sequence from a main shift register generator (SRG) one by one to map the samples to binary state symbols. It then spreads it to a short-period igniter sequence, thereby outputting it as a state signal through the pilot channel. In this case, the example of the transmitter is a base station.

A receiver acquires the igniter sequence of the received state signal to despread the pilot channel to successively detect the state samples of the main sequence one by one to correct the receiver main SRG state. This enables synchronizing the main SRG of the receiver to the transmitter main SRG. The example of the receiver is a mobile station.

The DSA technique can obtain a fast synchronization time between the transmitter and the receiver, but can be employed only for the binary signaling systems which transmit one bit per data symbol. Therefore, it has limited usefulness and fails to ensure an optimal transmission ratio due to the channel environment.

In practice, however, there are many DS/CDMA systems that adopt non-binary signaling, such as quaternary or 64-ary signaling for data transmission. Such systems have been commercialized and are widely used in communication systems. These DS/CDMA systems adopt a $2^b$-ary (b>1) method where at least one or more multi-bits correspond to one transmission symbol, in order to convey data in the unit of bit through binary transmission symbols and to increase the signal transmission ratio.

For this reason, when the proposed DSA technique is used in DS/CDMA systems, the DSA requires another dedicated modulator and demodulator set to convey the binary state signal for the synchronization of the SRG. But this arrangement makes the system inefficient. Even if dedicated MODEM equipment is employed for the state signal conveyance, the type of optimal signaling for fast acquisition may not necessarily be binary due to the allocated power budget, the igniter sequence period, and the channel environment.

Therefore, a more generalized DSA scheme is needed that can handle the SRG synchronization process for bit single schemes as well as multi-bit schemes, which ensures an optimal conveyance ratio under the conveyance environment, and achieves faster synchronization between the transmitter and the receiver. In this case, upon the transmission of the multi-bit of one bit or more, in the channel environment where the transmission error ratio is considerably low the multi-bit transmission can ensure the faster synchronization between the transmitter and the receiver.

The above references are incorporated by reference herein where appropriate for appropriate teachings of additional or alternative details, features and/or technical background.

SUMMARY OF THE INVENTION

An object of the invention is to provide a PDSA system that substantially obviates the problems caused by the limitations of the related art.

Another object of the invention is to provide a PDSA system that can effectively handle an SRG synchronization process in non-binary DS/CDMA systems and a signal acquisition method using the same.

Another object of the present invention is to extend the DSA technique to a PDSA technique for the SRG synchronization or the state signal processes of the SRGs of the transmitter and the receiver for a multi-bit state symbol.

It is another object of the invention to provide a PDSA system which adopts a PDSA scheme for fast synchronization of a spread band signal and a signal acquisition method using the PDSA system.

To achieve at least these objects in whole or in parts, there is provided a parallel distributed sample acquisition system including a transmitter for taking at least one or more first state samples at the same time from a first main sequence for data spreading and spreading the first state sample to an M-ary symbol state signal, thereby transmitting the state signal; and a receiver for detecting the first state sample from the transmitted state signal, comparing the first state sample detected with a second state sample taken from a second main sequence for data despreading, and correcting the state of the second main sequence in accordance with the compared result, thereby enabling the synchronization of the second main sequence to the first main sequence.

To achieve at least these objects in whole or in parts, there is further provided a parallel distributed sample acquisition system including a transmitter for taking a plurality of first state samples corresponding to user data from a main sequence for data spreading to spread the first state samples to a plurality of binary symbols state signals and spreading a plurality of user data, using the main sequence, thereby transmitting the plurality of state signals; and a receiver for despreading the plurality of state signals transmitted from the transmitter, detecting each first state sample from each state signal, comparing the plurality of first state samples detected with a plurality of second state samples taken from a second igniter sequence, and correcting the state of a second igniter sequence in accordance with the compared result, thereby despreading the data outputted from the transmitter.

To achieve at least these objects in whole or in parts, there is further provided a signal acquisition method using a parallel distributed sample acquisition system, including taking at least one or more state samples from a first main sequence for data spreading at the same time every state symbol period in a transmitter; mapping each state sample to a $2^b$-ary state symbol; spreading the mapped state symbol to an igniter sequence to transmit the spread symbol as a state signal of the first main sequence; synchronizing the igniter sequence with the transmitted state signal in a receiver; depsreading the transmitted state signal to detect the transmitted state sample from every state symbol; comparing the detected state sample with each state sample taken from a second main sequence for data dispreading; and correcting the state of the second main sequence for the synchronization of the second main sequence to the first main sequence.

To achieve at least these objects in whole or in parts, there is further provided a signal acquisition method using a parallel distributed sample acquisition system, including taking a plurality of state samples from a first main sequence for data spreading in a transmitter; parallel-spreading the each state symbol to a plurality of binary symbols by using igniter sequence to transmit the spread symbol as a state signal of the first main sequence; synchronizing the igniter sequence with the transmitted state signal in a receiver; despreading the transmitted state signal to detect each state sample of the first main sequence; comparing the detected state sample with each state sample taken from a second main sequence for data despreading; and correcting the state of the second main sequence for the synchronization of the second main sequence to the first main sequence.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1a is a block diagram illustrating the structure of the transmitter of the PDSA system according to a first embodiment of the present invention;

FIG. 2a is a block diagram illustrating the structure of the parallel sample despreader in FIG. 1b;

FIGS. 5a, 5b, and 5c are block diagrams illustrating the reorganization of FIGS. 1a and 1b;

FIG. 6 is a timing diagram illustrating the sampling and correcting time of the PDSA system according to the first embodiment of the present invention;

DETAILED DESCRIPTION OF PREFERRED EMBODIMENTS

Hereinafter, an explanation of the PDSA system according to a first embodiment of the present invention will be described with reference to the accompanying drawings.

The present invention according to the preferred embodiments extends a single sampling—single correction technique for the main sequence in the DSA to a parallel sampling—parallel correction technique. Therefore, the transmitter preferably makes b-bit state samples for a main sequence of a single state symbol by employing a $2^b$-ary modulation and demodulation technique, thereby conveying the state symbol. The receiver enables synchronizing by using a main sequence having the period $2^L-1$.

Referring first to FIG. 1a, the transmitter according to a first preferred embodiment is composed of a PDSA spreader 100 which takes at least one first state sample from a main sequence for data spreading. It outputs the state sample and spreads user data, using the main sequence, and also outputs a data signal. The transmitter further includes a parallel sample spreader 110 which inputs the first state sample outputted from the PDSA spreader 100 to generate an M-ary symbol, and spreads the generated M-ary symbol to a first igniter sequence, thereby conveying it as a state signal.

Figure 1B:
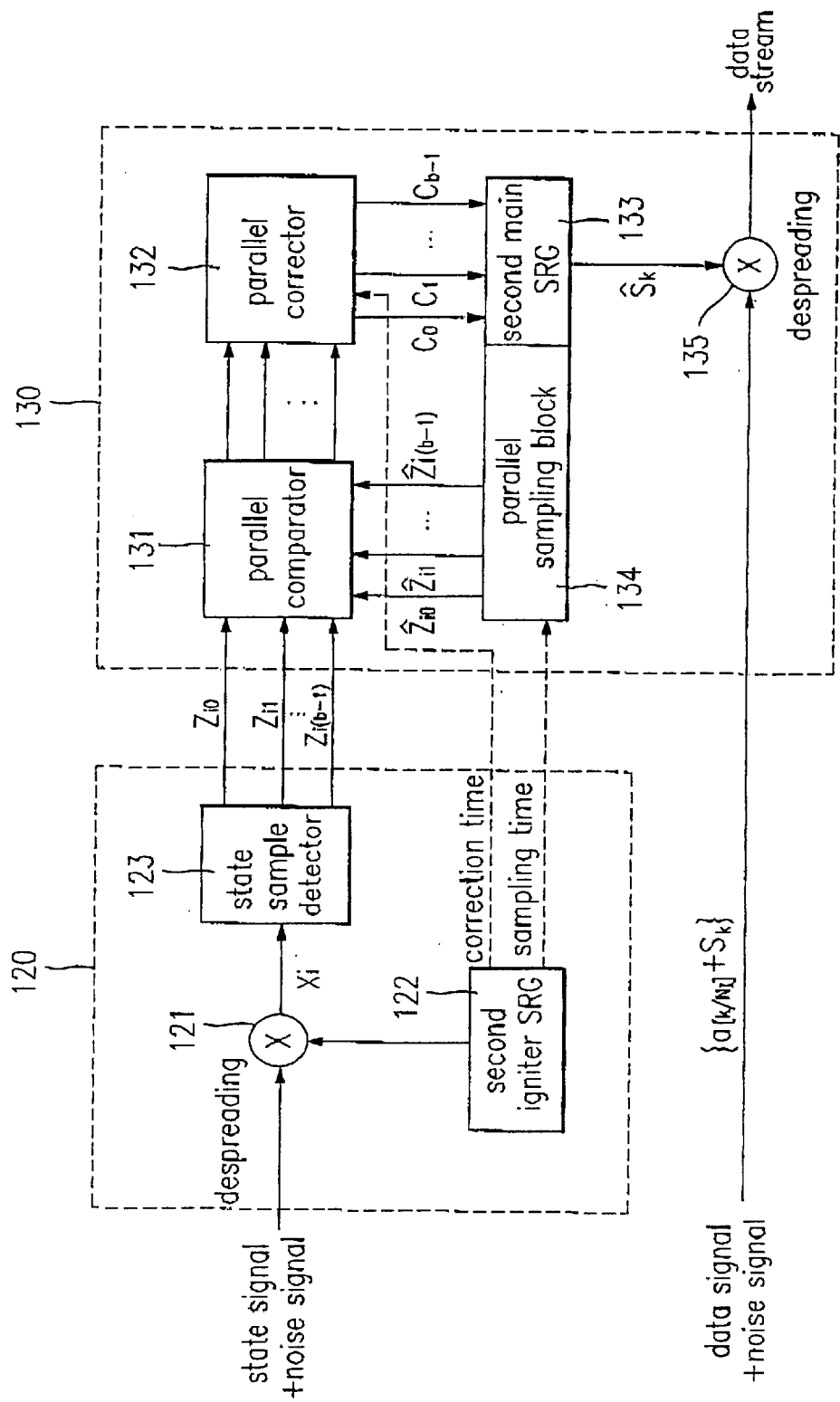
FIG. 1b is a block diagram illustrating the structure of the receiver of the PDSA system according to the first embodiment of the present invention.

Referring then to FIG. 1b, the receiver is composed of a parallel sample despreader 120 which acquires the corresponding igniter sequence of the state signal outputted from the transmitter and despreads the received state signal, using the acquired igniter sequence to detect the first state sample conveyed from the transmitter. The receiver also includes a PDSA despreader 130 which compares a second state sample taken from a second main sequence with the first state sample from the parallel sample despreader 120 and corrects the state of the second main sequence in accordance with the compared result, thereby despreading the data conveyed from the transmitter.

The PDSA spreader 100 of the transmitter preferably includes a first main SRG 101, which generates the main sequence. It also includes a time-advanced sampling block 102, which takes the b state samples of the main sequence generated in the first main SRG 101 in advance, and a spreader 103 that multiplies the user data by the main sequence generated in the first main SRG 101 to spread the multiplied result, thereby outputting the data signal. In this example, the time-advanced parallel sampling block 102 includes b circuits in order to take the b state samples from the first main SRG 101.

The parallel sample spreader 110 preferably includes a symbol generator 111, which maps the b state samples taken in the time-advanced parallel sampling block 102 to the corresponding $2^b$-ary symbol. It also includes a first igniter SRG 112, which generates the igniter sequence carrying the state samples of the main SRG of length L for a fast acquisition of the main sequence to the receiver. It further includes a spreader 113, which multiplies the $2^b$-ary symbol generated in the symbol generator 111 by the igniter sequence generated in the first igniter SRG 112 to spread the multiplied result, thereby outputting it as the state signal.

On the other hand, the parallel sample despreader 120 in the receiver (FIG. 1b) preferably includes a second igniter SRG 122, which acquires the igniter sequence of the state signal conveyed in the transmitter to generate its own igniter sequence for despreading the state signal. It also includes a despreader 121, which despreads the state signal conveyed in the transmitter, using the igniter sequence generated in the second ingiter SRG 122, and a state sample detector 123, which detects the b state samples conveyed by the transmitter from the despread state signal.

The PDSA despreader 130 of the receiver preferably includes a second main SRG 133, which generates the main sequence. It also includes a parallel sampling bock 134, which takes the b state samples from the second main SRG 133, a parallel comparator 131, which compares the b state samples detected from the state sample detector 123 with the state samples taken in the parallel sampling block 134, and a parallel corrector 132, which corrects the second main SRG 133 in accordance with the compared result of the parallel comparator 131. It further includes a despreader 135, which despreads the data signal outputted from the PDSA spreader 100, using the main sequence generated in the second main SRG 133 to thereby output the data stream. In this example, the second igniter SRG 122 provides the reference point of the timing for the sampling and correction for the second main SRG 133.

In operation, the PDSA spreader 100 of the transmitter and the PDSA despreader 130 of the receiver take the synchronization function of the main sequence, while the parallel sample spreader 110 of the transmitter and the parallel sample despreader 120 of the receiver take the parallel-sample conveyance function through a radio interface. Those two functions are currently supported by two different SRGs, that is, the main SRGs 101 and 133 and the igniter SRGs 112 and 122 residing in the transmitter and receiver, respectively.

First, in operation in the transmitter, the first main SRG 101 of the PDSA spreader 100 generates the main sequence, that is, the user-specific PN sequence employed for the data spreading. The first igniter SRG 112 generates the igniter sequence, which carries the state sample of the main SRG of length L for a fast acquisition of the main sequence generated in the first main SRG 101 to preferably send to the receiver. At this time, the period of the igniter sequence, $N_I$, is preferably designed to be much shorter than the main sequence period, $N_M(=2^L-1)$.

The time-advanced parallel sampling block 102 takes the b state samples $z_{ij}$, (j=0, 1, . . . , b−1) of the main sequence generated from the first main SRG 101 in advance. In this case, the time-advanced parallel sampling block 102 takes the b samples $z_{ij}$'s simultaneously at time $(R+i-1)N_I$, for a reference time R, which are the b main SRG sequence values to be generated at times $(R+i)N_I+\alpha_j$, j=0,1, . . . ,b−1, respectively, for $0 \leq \alpha_0 < \alpha_1 < \ldots < \alpha_{b-1} < N_I$.

The time-advanced parallel sampling block 102 provides the b state samples $z_{ij}$'s to the symbol generator 111 of the parallel symbol spreader 110, and the symbol generator 111 preferably maps the b state samples provided by the PDSA spreader 100 into a Hadamard $2^b$-ary symbol to correspond to the M-ary orthogonal symbol $x_i$. The spreader 113 spreads the symbol $x_i$ mapped and outputted to the $2^b$-ary state symbol, using the igniter sequence of one period, and preferably outputs it to the receiver. At this time, the $2^b$-ary state symbol spread in the spreader 113 is conveyed as the state signal in the receiver.

Each user data $a_{ij}$ is discriminated using an orthogonal Walsh code and then spread by the main sequence generated in the first main SRG 101 before conveyance.

In the first preferred embodiment of the present invention, M is preferably set to $2^b$, such that the symbol generator 111 maps the b binary samples $z_{i0}, z_{i1}, \ldots, z_{i(b-1)}$ provided by the PDSA spreader 100 into one symbol out of $2^b$ candidates in every $N_I$ chip interval.

In the receiver, on the other hand, the despreader 121 of the parallel sample despreader 120 acquires the synchronization of the igniter sequence, using the received state signal. It then despreads the received state signal, using the igniter sequence generated in the second igniter SRG 122. The state sample detector 123 detects the conveyed state samples $z_{ij}$, j=0,1, . . . ,b−1 mapped into each M-ary orthogonal symbol from the despread state signal and passes them to the PDSA despreader 130 at time $(R+i)N_I$, preferably at the same time.

The parallel sampling block 134 of the PDSA despreader 130 generates its own b state samples $\hat{z}_{ij}$ in the main sequence generated in the second main SRG 133 at time $(R+i)N_I$ at the same time so as to convey the b state samples to the parallel comparator 131. The parallel comparator 131 compares the state samples $z_{ij}$ provided by the state sample detector 123 with the state samples $\hat{z}_{ij}$ provided by the parallel sampling block 134. In this case, the jth sample $\hat{z}_{ij}$ taken in the parallel sampling block 134 corresponds to the value $\hat{s}_{(R+1)N_I+\alpha_j}$ in the main sequence generated in the second main SRG 133.

For each j=0,1, . . . ,b−1, if $z_{ij}$ coincides with $\hat{z}_{ij}$, the parallel corrector 132 takes no action for the second main SRG 133. However, if $z_{ij}$ does not coincide with $\hat{z}_{ij}$, then jth correction circuit correction pulses are issued at time $(R+i)N_I+D_c$ with an appropriate delay time $D_c$, which satisfies $0 < D_c \leq N_I$, thereby correcting the state of the second main SRG 133. At this time, the parallel sampling and correction processes are timed by the parallel sampling and correction pulses issued by the second igniter SRG 122.

It should be noted that the b state samples in the sampling and correcting processes of the state signal according to this embodiment are processed simultaneously.

Referring next to FIG. 2a, the structure of the parallel sample despreader in FIG. 1b is illustrated. As shown in FIG. 2a, the parallel sample despreader 120 includes $2^b$ multi-correction branches 200a~200n for $2^b$ as each M-ary orthogonal symbol. It also includes a decision block 201, which determines whether the igniter sequence is acquired, using the output signal from each multi-correction branch, by comparing the output signal with a preset threshold value, or detects the conveyed b state samples.

The parallel sample despreader 120 illustrated in FIG. 1b acquires the igniter sequence of the conveyed state signal in the transmitter, using the $2^b$ noncoherent correction branches. Specifically, the transmitter maps the b state samples taken by the first main sequence into one symbol out of the $2^b$ orthogonal symbols. It spreads this to the igniter sequence of a period, such that the multi-correlation branches 200a~200n having the same number as the orthogonal symbols provided in the parallel sample despreader 120, and despreads and correlates the state symbols so as to output the energy for each state symbol. At this time, each of the multi-correlation branches 200a~200n multiplies its own igniter sequence c(t) by the orthogonal state symbol waveform $s_k(t)$ to thereby multiply the value $m_k(r)^*$, k=0,1, . . . ,$2^b-1$ by the state signal, thereby despreading the multiplied result.

Then, the decision block 201 takes the correlation branch value having a maximum output among the energy values for the state symbols outputted from the multi-correlation branches 200a~200n and compares it with a prescribed threshold value. The decision block 201 shifts the clock until the maximum output value exceeds the preset threshold value to thereby synchronize its own igniter sequence generation clock and determines the correlation branch having a highest output among the output energies of the multi-correlation branches 200a~200n, using the synchronized igniter sequence. It thus detects the conveyed b state samples in the corresponding symbol interval.

Figure 2B:
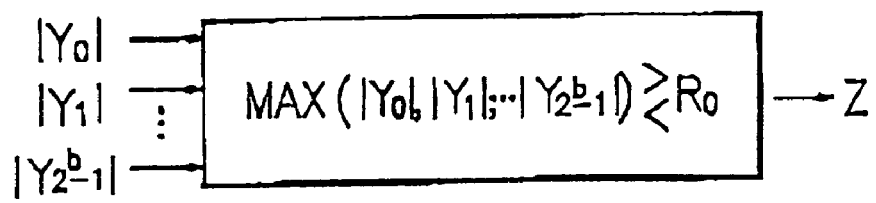
FIG. 2b is a drawing illustrating decision logic in the igniter sequence acquisition mode.
Figure 2C:
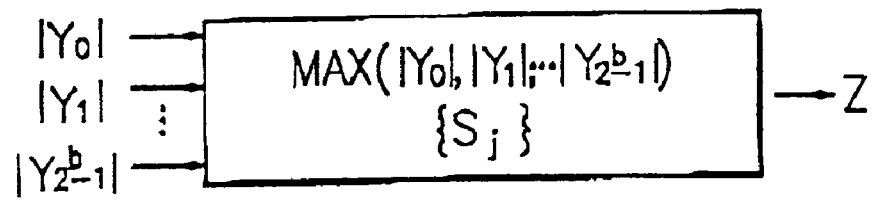
FIG. 2c is a drawing illustrating decision logic in the sample detection mode.

FIG. 2b illustrates the decision logic with which the decision block 201 takes the correlation branch having a highest output amount the outputs of the multi-correlation branches 200a~200n and checks whether the output of the correlation branch exceeds the preset threshold value $R_0$ to synchronize its own igniter sequence clock. FIG. 2c illustrates the decision logic with which the decision block 201 discriminates the correlation branch having a highest output among the outputs of the multi-correlation branches 200a~200n to thereby detect the conveyed state sample from the transmitter.

Figure 3:
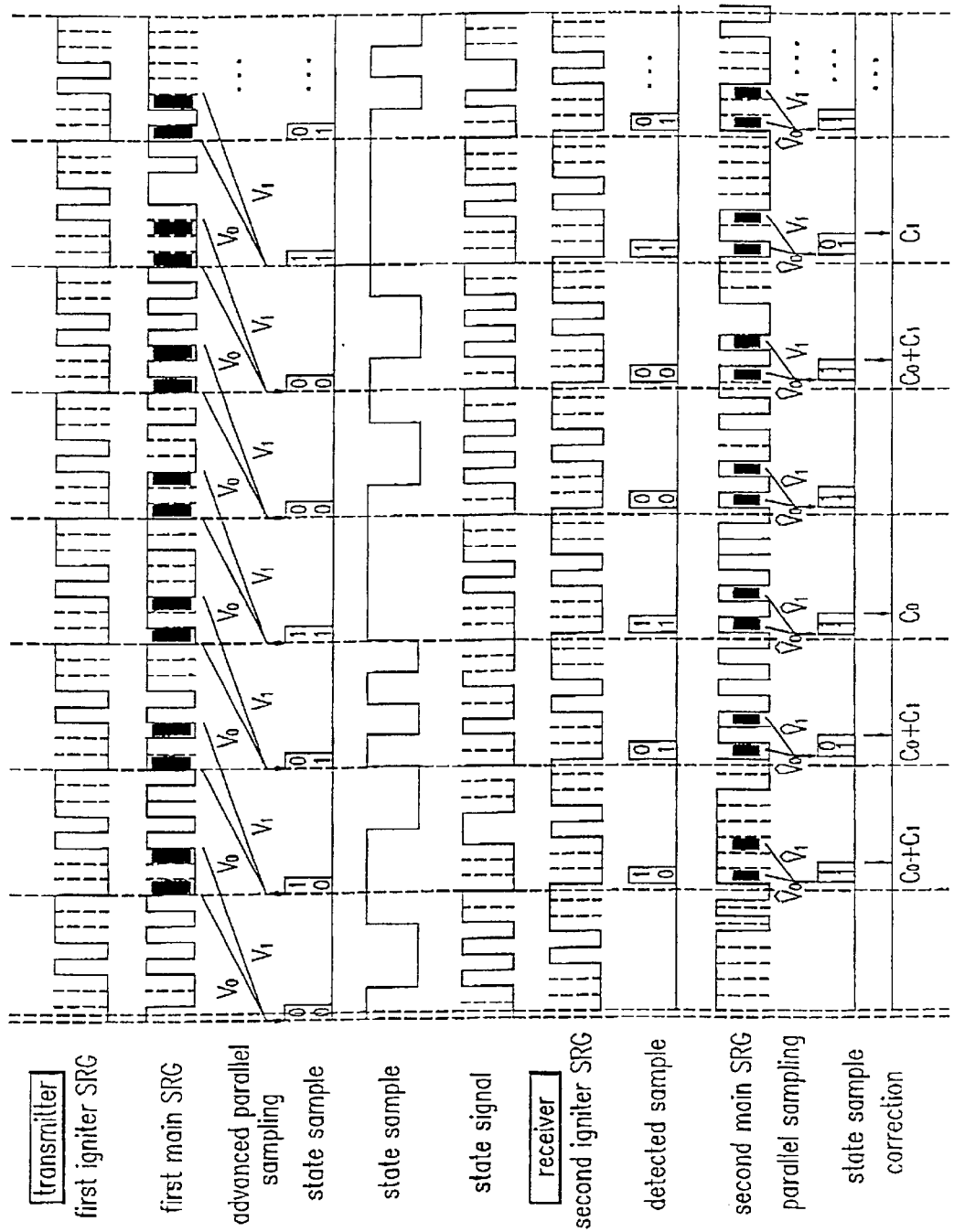
FIG. 3 is a timing diagram illustrating the operation order of the transmitter and receiver in FIGS. 1a and 1b.

FIG. 3 is a timing diagram illustrating the operation order of the transmitter and receiver in FIGS. 1a and 1b, respectively.

Referring to FIG. 3, in the transmitter, if the period of the igniter sequence is $N_1$, the b state samples of the main sequence to be generated at next period of the igniter sequence, for the reference time R, are taken in advance. Additionally, the state samples are mapped to the M-ary ($M=2^b$) Hadamard orthogonal symbol, thereby generating the state symbol. Next, the generated state symbol is spread, using the igniter sequence and then conveyed as the state signal for the main SRG in the transmitter to the receiver.

In the receiver, the conveyed state signal from the transmitter is correlated to acquire the igniter sequence, thereby detecting the conveyed b state samples. The state samples $\hat{z}_{ij}$ of the main SRG at the sampling time provided by the igniter sequence are taken in and compared with the detected state samples $z_{ij}$, thereby processing the correction for the main SRG thereof. At this time, the correction is processed with the delay time $D_c$. In this case, if the $D_c$ is set to '1', the correction is processed without any delay.

Figure 4:
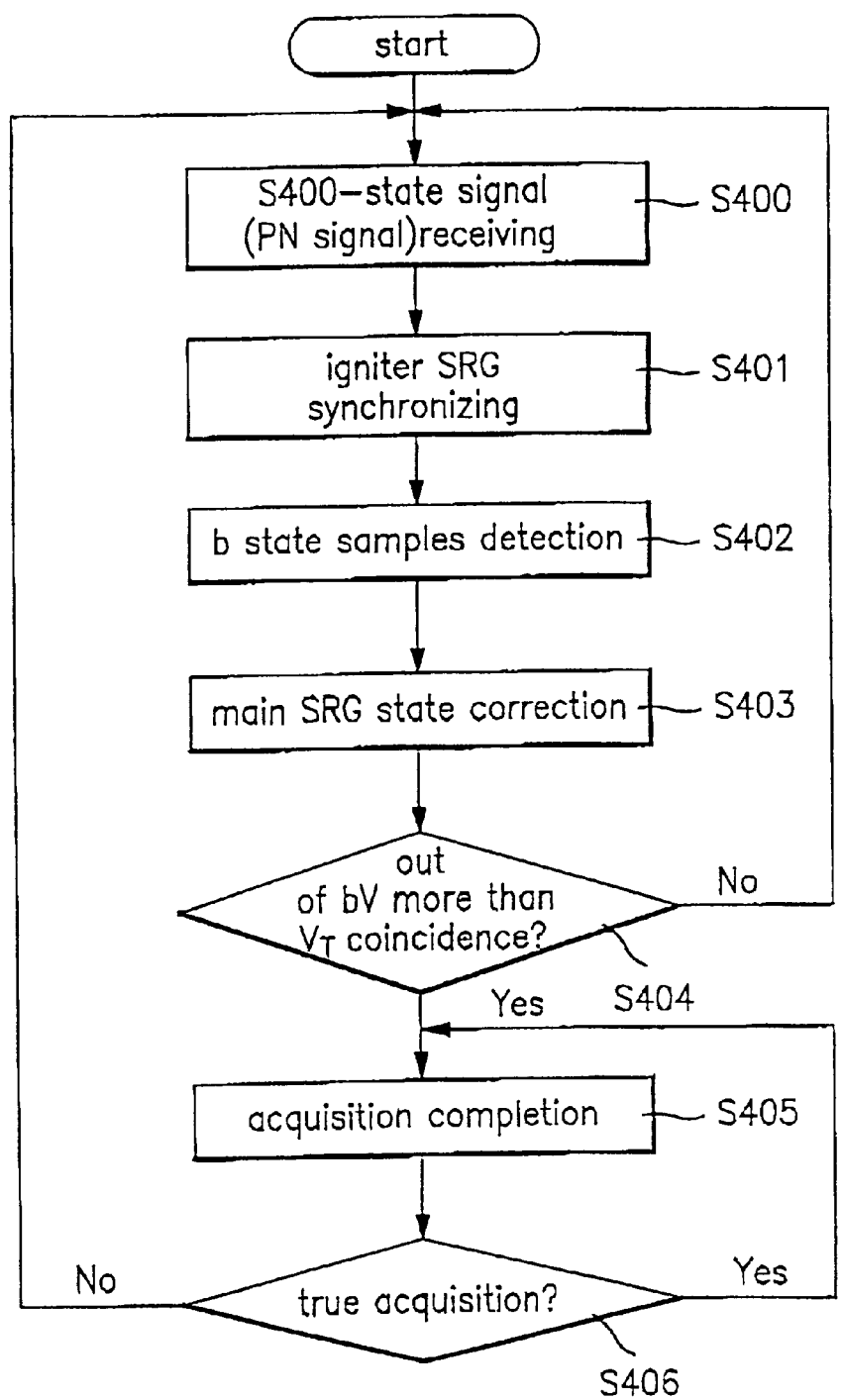
FIG. 4 is a flowchart illustrating the PDSA process of the receiver in FIG. 1b.

FIG. 4 is a flowchart illustrating the PDSA process of the receiver in FIG. 1b. As shown in FIG. 4, first the receiver receives the conveyed state signal in the transmitter, as shown in step S400. Next, the parallel sample despreader of the receiver acquires the igniter sequence, using the correction of the received state signal, as shown in step S401 and detects the b state samples from the state signal, as shown in step S402.

Then, the detected state samples and the receiver-generated state samples are compared to correct the state of main sequence thereof, as shown in step S403. The comparing-correcting process is repeated [L/b] times in case of the main SRG of length L.

A verification process determines whether the conveyed and receiver-generated samples coincide more than $V_T$ times out of bV sample comparisons, as shown in step S404. If more than $V_T$ coincidences occur, the receiver determines the synchronization completion and despreads the data channel spread and outputted by the main sequence, as shown in step S405, otherwise, the initial igniter sequence search mode is resumed.

Despite the above verification process, there still exists room for false synchronization, as it is still probable, no matter how small the probability may be, that the $V_T$ sample-sets coincide without having true SRG synchronization. Therefore, the receiver uses a conforming process that confirms whether the acquired synchronization state is true or false during the detection of the main data signal, as shown in step S406. The data detecting performances such as bit error probability is below the desired level in the case of true synchronization, such that the data decoding performance for a certain period of time is monitored in the receiver. If the acquisition is determined to be true, the data detection is continued, but if the acquisition is determined to be false, the initial igniter sequence searching stage is resumed.

Figure 5B:
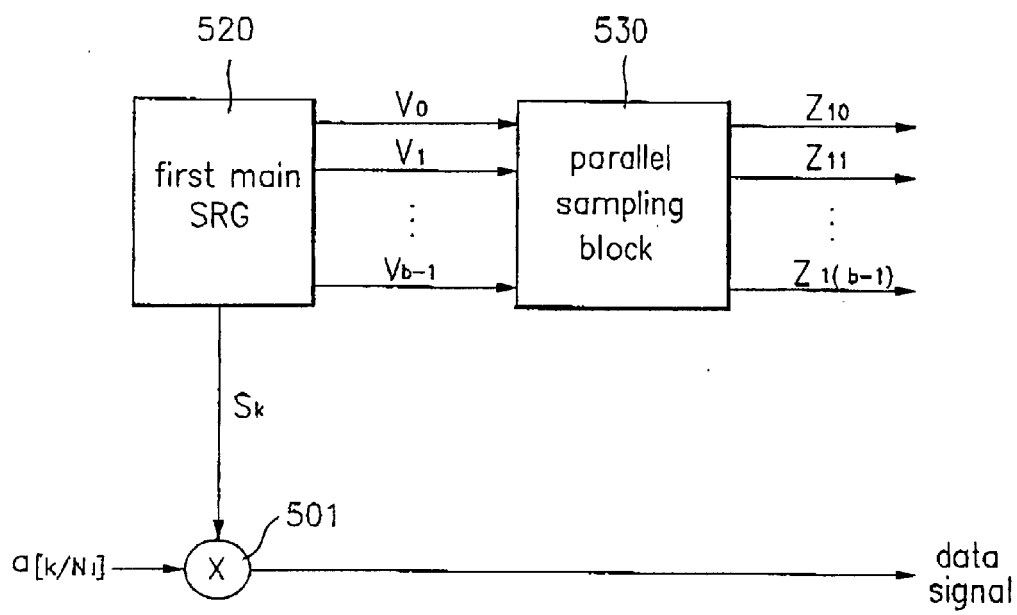
Figure 5C:
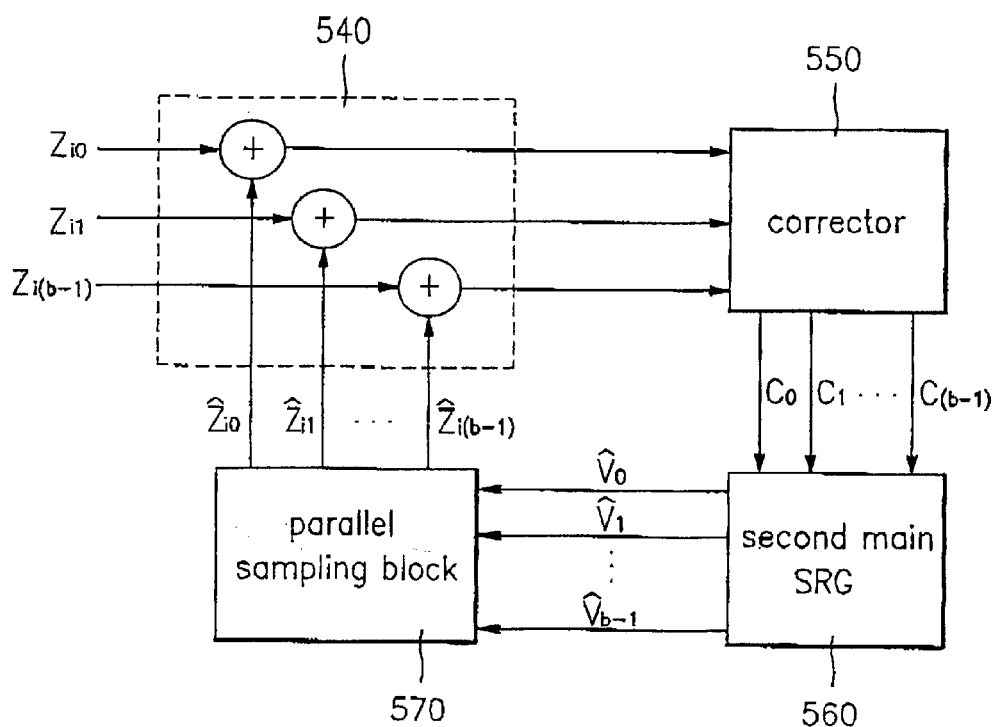

FIGS. 5a to 5c are block diagrams illustrating the transmitter-receiver systems of FIGS. 1a and 1b in another form. Referring first to FIG. 5a, the time-advanced parallel sampling block 511 and the parallel sample spreader 512 in the transmitter and the parallel sample despreader 513 in the receiver are shown together in a parallel sampling block 510. FIG. 5a is an equivalent circuit to those shown in FIGS. 1a and 1b, assuming that the parallel sample despreader 513 in the receiver receives the normal state signal, that is, the state samples from the transmitter.

As shown in FIG. 5b, the spreader of the PDSA system is composed of a first main SRG 520 and a parallel sampling block 530 parallel sample spreader 512 (FIG. 5a) in the transmitter and the parallel sample despreader 513 (FIG. 5a) in the receiver, where the counterpart signal is transmitted.

FIG. 5c shows a view of the PDSA despreader of FIG. 1b. It includes a parallel comparator 540, a corrector 550, a second main SRG 560, and a parallel sampling block 570.

FIG. 6 is a timing diagram illustrating the sampling and correcting time of the PDSA system according to the first embodiment of the present invention. Referring to FIG. 6, the time-advanced parallel sampling block of the transmitter takes the b state samples of the main sequence at the interval of the igniter period N, at the time $(R+i-1)N_I$ in advance and maps the b state samples into the $2^b$-ary symbol, thereby transmitting the state signal to the receiver. Then, the receiver receives the state signal and acquires the igniter sequence, whereby the virtual sampling time for the $z_{ij}$ in the transmitter coincides to the receiver-generated sampling time for the $\hat{z}_{ij}$ in the receiver.

In the following, a mathematical modeling method of the transmitter and receiver in the PDSA system of the present invention according to the preferred embodiments will be discussed.

Synchronization of PDSA spreader and PDSA despreader

Let $d_k$ and $\hat{d}_k$ denote the state vectors (L-vectors) of the spreader and despreader SRGs at time k, respectively. Let T denote that state transition matrix (an L×L matrix). Let h denote the generating vector (an L-vector) that generates the sequence value $\{S_k\}$ or $\{\hat{S}_k\}$ out of the state vectors $d_k$ and $\hat{d}_k$ through the relation, $$S_k = h^t \cdot d_k,$$

$$\hat{S}_k = h^t \cdot \hat{d}_k$$

let $c_j$, j=0,1, . . . ,b−1, denote the jth correction vector that corrects the old state vector $\hat{d}_{old}$ to a new state vector $\hat{d}_{new}$ through the relation, $$\hat{d}_{new} = \hat{d}_{old} + (z_{i0} + \hat{z}_{i0})c_0 + \ldots + (z_{i(b-1)} + \hat{z}_{i(b-1)})c_{b-1}$$

In compliance with this parallel correction processing, the L state samples are rearranged in W(=[L/b]bundles of b samples. Then the relation of L−1=b(W−1)+(r−1), 1≦r≦b, W≧2 is obtained. At this time, the samples $z_{ij}$ and $z\check{\,}\hat{z}_{ij}$ are taken at the virtually same sampling time $(R+i-1)N_I$, and the related correction is made at the correction time (R+i−1)

$N_I D_c$. Note that the samples $z_{ij}$ and $\check{z}_{ij}$ are the sequence values that are supposed to be generated at $(R+i-1)+\alpha_j$, $\leq \alpha_0 < \ldots < \alpha_{b-1}$.

The samples $z_{ij}$ and $\hat{z}_{ij}$ are thus related to the state vectors by the relations of the following mathematical expression (1):

$$z_{ij}=s_{(R+i)N_I+\alpha_j}=h^t \cdot d_{(R+i)N_I+\alpha_j}, \hat{z}_{ij}=s_{(R+i)N_I+\alpha_j}=h^t \cdot \hat{d}_{(R+i)N_I+\alpha_j}=0,1,\ldots,W-1, j=0,1,\ldots,b-1 \quad (1)$$

and the state vectors at the correction time takes the following expression (2):

$$d_{(R+i)N_I+D_c} = T \cdot d_{(R+i)N_I+D_c-1} \quad (2)$$

$$\hat{d}_{(R+i)N_I+D_c} = T \cdot \hat{d}_{(R+i)N_I+D_c-1} + \sum_{j=0}^{h-i}(z_{ij}+\hat{z}_{ij})C_j$$

$$i = 0, 1, \ldots, W-1$$

Referring to the expressions (1) and (2), the state distance vector, i.e., $$\delta_k \stackrel{\Delta}{=} d_k + \hat{d}_k$$

has the following recursive relation (3):

$$\delta_{(R+i)N_I-D_c} = \begin{cases} \left(T^{D_c}+\sum_{j=0}^{h-1}c_j \cdot h_t \cdot T^{\alpha_j}\right) \cdot \delta_{RN_I}, \ i=0, \\ \left(T^{N_I}+\sum_{j=0}^{h-1}c_j \cdot h_t \cdot T^{\alpha_j+N_I+D_c}\right) \cdot \delta_{R+i-1)N_I+D_c}, \\ i=1,2,\ldots,W-1 \end{cases} \quad (3)$$

By applying this relation (3) repeatedly for $L$ (=$b(W-1)+r$) times of corrections, for the $L \times L$ correction matrix as given by the following relation (4), the finally corrected state distance vector is obtained by the following relation (5):

$$\Lambda \stackrel{\Delta}{=} \left(T^{N_I}+\sum_{j=0}^{h-1}c_j \cdot h_t \cdot T^{\alpha_j+N_I-D_c}\right)^{W-1} \cdot \left(T^{D_c}+\sum_{j=0}^{h-1}c_j \cdot h_t \cdot T^{\alpha_j}\right) \quad (4)$$

$$\delta_{(R+W-1)N_I+C_c} = \Lambda \cdot \delta_{RN_I} \quad (5)$$

Therefore, in order to achieve the synchronization of the main SRG by applying W parallel corrections, it is necessary to make the final state distance vector $\delta_{(R+W-1)N_I+D_c}$ a zero vector regardless of the initial state distance vector $\delta_{RN_I}$.

The synchronization problem of the PDSA spreader/despreader pair turns to a problem of determining appropriate values of $N_I$, $\alpha_i$, $D_c$ and $c_j$(j=0,1, ..., b−1) that make the correction matrix null.

Synchronization Parameter Design

The process of designing the synchronization parameters $N_I$, $\alpha_i$, $D_c$ and $c_j$ will next be described.

For a PDSA system characterized by b, T, and h, the discrimination matrix $\Delta$ is defined to be the bQ×L matrix as given by the following expression (6):

$$\Delta \stackrel{\Delta}{=} \begin{bmatrix} h^t \cdot T^{\alpha_0} \\ \vdots \\ h^t \cdot T^{\alpha_{b-1}} \\ \vdots \\ h^t \cdot T^{(W-1)N_I-\alpha_3} \\ \vdots \\ h^t \cdot T^{(W-1)N_I-\alpha_{b-1}} \end{bmatrix} \quad (6)$$

The igniter sequence period $N_I$ and sampling times, $\alpha_0$, $\alpha_1$, ..., $\alpha_{b-1}$ are determined, based upon the following theorems 1 to 3.

Theorem 1

This is the parallel sampling condition. For a nonsingular state transition matrix T, the correction matrix $\Lambda$ in expression (4) can be zero only if the igniter sequence period $N_I$ and the sampling times $\alpha_j$, j=0,1, ..., b−1 are chosen such that the rank of the discrimination matrix $\Delta$ in expression (6) is L.

In more detail, there are $$\binom{bW}{L}$$

possible combinations in selecting the L independent samples out of bW received ones. This means that many possibly different synchronization systems can exist.

The igniter sequence period $N_I$ and sampling times $\alpha_0, \alpha_1, \ldots, \alpha_{b-1}$ are selected such that the PDSA matrix $\bar{\Delta}$ (an L×L matrix) composed of the last L rows of the discrimination matrix $\Delta$ is nonsingular as given by the following expression (7).

$$\bar{\Delta} \stackrel{\Delta}{=} \begin{bmatrix} h^t \cdot T^{\alpha_{b-r}} \\ \vdots \\ h^t \cdot T^{\alpha_{b-1}} \\ \vdots \\ h^t \cdot T^{N_I+\alpha_0} \\ \vdots \\ h^t \cdot T^{N_I+\alpha_{b-1}} \\ \vdots \\ h^t \cdot T^{(W-1)N_I+\alpha_0} \\ \vdots \\ h^t \cdot T^{(W-1)N_I+\alpha_{b-1}} \end{bmatrix} \quad (7)$$

The correction delay $D_c$, and the correction vectors $c_j$, j=0,1, ..., b−1 are determined by the following theorem 2:

Theorem 2

This relates to PDSA correction delay and correction vectors. For a nonsingular state transition matrix T, let the igniter sequence period $N_I$ and sampling times, $\alpha_0, \alpha_1, \ldots, \alpha_{b-1}$, be chosen such that the PDSA matrix $\bar{\Delta}$ is nonsingular. Then, the correction matrix $\Lambda$ becomes a zero matrix if the correction vectors $c_j$, j=0,1, ..., b−1, take the following expressions (8), for the arbitrary correction delay time $D_c$ for $0 < D_c \leq N_I$:

$$c_j = \begin{cases} T^{(W-1)N_1+D_c} \cdot \overline{\Delta}^{-1} \cdot e_{(W-1)b+j}, & \text{if } r = b, \\ T^{(W-1)N_1+D_c} \cdot \overline{\Delta}^{-1} \cdot \{e_{(W-2)b+r+j} + y_j\}, & \text{if } 0 < r < b, \end{cases} \quad (8)$$

$$y_j \triangleq \sum_{k=0}^{\min(r-1, b-r-1)} u_k (h^t \cdot T^{\alpha_k} \cdot \overline{\Delta}^{-1} \cdot e_{(W-2)b+r+j}) e_k,$$

$$j = 0, 1, \ldots, b-1$$

Wherein, the $e_i$, i=0,1, ..., L–1, denotes the ith standard basis vector whose ith element is 1 and the others are 0, and $u_k$ is a binary number that can be arbitrarily set to either 0 or 1 for k=0,1, ..., r–1.

Now, it is considered how to realize the parallel sampling and time-advanced parallel sampling.

Theorem 3

This is the parallel sampling vector condition. The sample $z_{ij}$ generated at time $(R+i)N_I + \alpha_j$ is identical to the time-advanced sample taken at time $(R+i-1)N_I$, using the sampling vector $V_j = (T^{N+\alpha_j})^t \cdot h$, j=0,1, ...,b–1, or to the sample taken at time $(R+i)N_I$, using the sampling vector $\hat{V}_j = (T^{\alpha_j})^t \cdot h$, j=0,1, ...,b–1.

Based on the theorems 1 to 3, the PDSA synchronization parameters are preferably determined using the following procedure. For an SRG structured by the state transition matrix T and the generating vector h, the igniter sequence period $N_I$ and sampling times, $\alpha_j$, j=0,1, ...,b–1 are taken such that the PDSA matrix $\overline{\Delta}$ becomes nonsingular. Then, an arbitrary correction delay $D_c$ that satisfies $0 < D_c \leq N_I$ is taken, and the correction vector $c_j$ is determined, based upon the expression (8). The parallel sampling vectors $v_j$ and $\hat{v}_j$ are then determined based upon Theorem 3.

Now, the PDSA system design examples using the above-discussed synchronization parameters will be described.

Example 1

It is assumed that the main SRG sequence is an m-sequence whose characteristic polynomial is $\psi(x) = x^{15} + x^{13} + x^8 + x^7 + x^5 + 1$, with the transition matrix T an generating vector h of the main SRG respectively given by $$T = \begin{bmatrix} 0 & I_{14 \times 14} \\ 1 & t \end{bmatrix},$$

t=[00001011100010], h=[100000000000000]t. At this time, an extended m-sequence of period 128 (=$2^7$) whose start is marked up, for example, by the last bit "1" in the 8-bit string "00000001" as the igniter sequence is taken.

Considering the quaternary signaling system where two bits are conveyed per symbol, W=8 and r=1 are calculated from the expression, L=(W–1)b+r. And, if $\alpha_0 = 0$ and $\alpha_1 = N_I/b = 64$ are taken, the PDSA matrix $\overline{\Delta}$ is nonsingular. If the delay time $D_c$ is set to '1' for the intermediate correction, the following two correction vector sets are obtained by assigning $u_0 = 0$ and $u_0 = 1$, respectively.

$$\begin{cases} c_0 = [111011001001011]^t, \\ c_1 = [111100010001011]^t, \end{cases}$$

$$\begin{cases} c_0 = [111011001001011]^t, \\ c_1 = [111010010011010]^t. \end{cases}$$

On the other hand, by Theorem 3, the time-advanced parallel sampling vectors and parallel sampling vectors are obtained as follows:

$$\begin{cases} v_0 = [1011011100000010]^t, \\ v_1 = [0001111111110000]^t, \end{cases}$$

$$\begin{cases} \hat{v}_0 = [1000000000000000]^t, \\ \hat{v}_1 = [1000110111100001]^t. \end{cases}$$

Figure 7A:
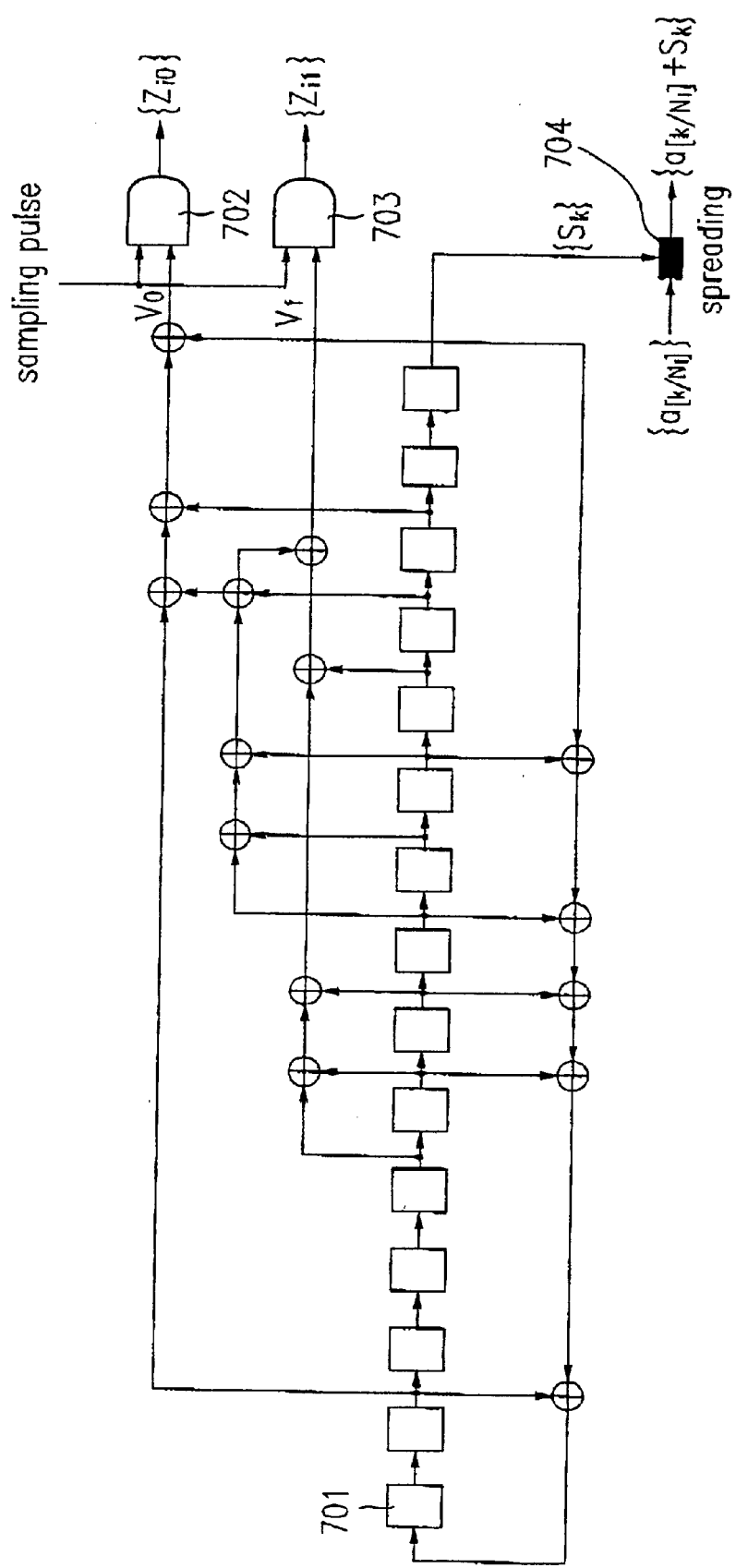
FIG. 7a is a circuit diagram illustrating the PDSA spreader according to the first embodiment of the present invention.
Figure 7B:
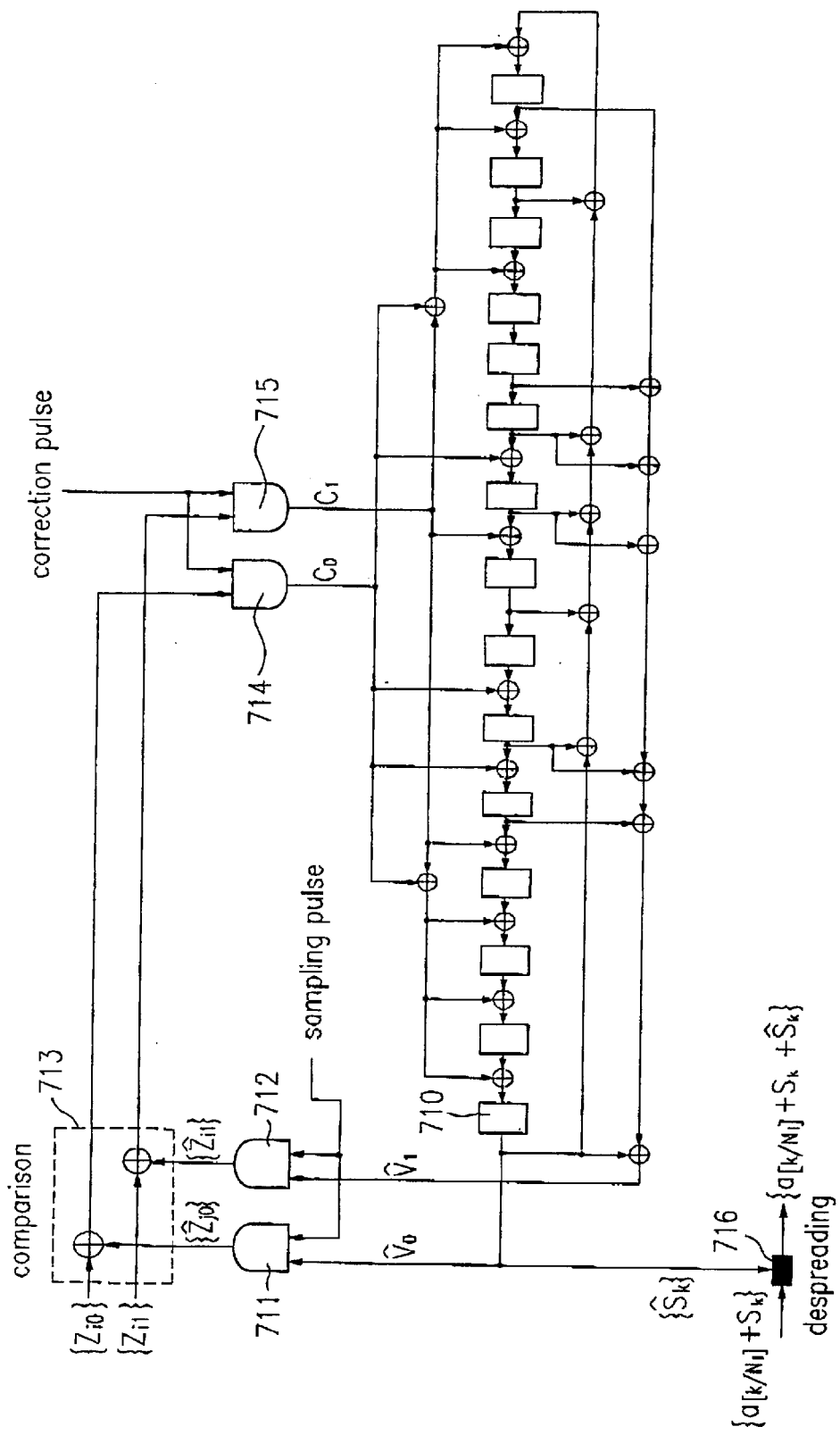
FIG. 7b is a circuit diagram illustrating the PDSA despreader according to the first embodiment of the present invention.

FIGS. 7a and 7b illustrate the PDSA spreader circuit and the PDSA despreader circuit employing the synchronization parameters obtained in the above according to the first embodiment. As shown in FIG. 7a, the PDSA spreader circuit includes a main shift register generator (SRG) 701 which generates the sequence value $\{S_k\}$, a time-advanced sampling circuit which includes logic gates 702 and 703 for outputting a prescribed number of state samples of sequence $\{S_k\}$, and a spreader 704 which multiplies user data by the sequence generated by the SRG to generate the data signal.

As shown in FIG. 7b, the PDSA despreader circuit includes a main shift register generator 710, a parallel sampling block which includes logic gates 711 and 712 for taking received state samples from the receiver main SRG, a parallel comparator 713 which corrects the state of the main SRG, a parallel corrector which includes logic gates 714 and 715 for correcting the state of the main SRG 710 in accordance with a result of the comparator, and a despreader 716 which despreads the data signal output from the transmitter using the main sequence generated by the receiver SRG to thereby output a data stream.

Example 2

Figure 8:
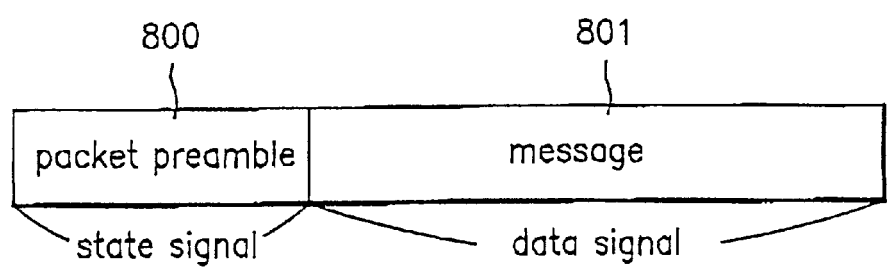
FIG. 8 illustrates the packet structure for ad hoc communication systems where the PDSA of preferred embodiments of the present invention is adopted.

The PDSA method according to the present invention can be applied to the ad hoc communication systems. FIG. 8 illustrates the packet structure for the PDSA based ad hoc communications. The packet is composed of packet preamble 800 and a message 801, as illustrated in FIG. 8. At this time, the preamble 800 is the state signal, which is spread by an igniter sequence, and the message 801 is the data signal, which is spread by the main sequence.

The transmitter in the ad hoc communication system first sends the packet preamble 800 of fixed length. At this time, the packet preamble 800 preferably contains the main SRG state signal spread by the igniter sequence selected from the igniter sequence pool. The igniter sequence pool is a set of available igniter sequences, which may consist of one or more igniter sequences. The packet preamble 800 enables the packet receivers to synchronize their igniter and main SRGs to the transmitter ones.

The packet preamble 800 is followed by the message 801, which is preferably composed of the target addresses, user data, etc., and spread by the main sequence. Each main sequence is generated out of the main SRG and differentiated by different phase offset.

The receiver first acquires the igniter sequence, employing one or more igniter correlators. Once the igniter sequence is acquired, the PS-despreader uses it t restore the b state samples through the noncoherent detection. Then the PDSA despreader achieves the synchronization of the main sequence, using the state samples.

The transmitter and receiver of the PDSA system as described herein may also be applied to the multi-carrier CDMA system. In other words, instead of mapping b bits to M=$2^b$(b square of 2)-ary symbol, the multi-carrier CDMA system can send the b binary symbols through b parallel branches. This will next be described with reference to FIGS. 9a and 9b.

Figure 9A:
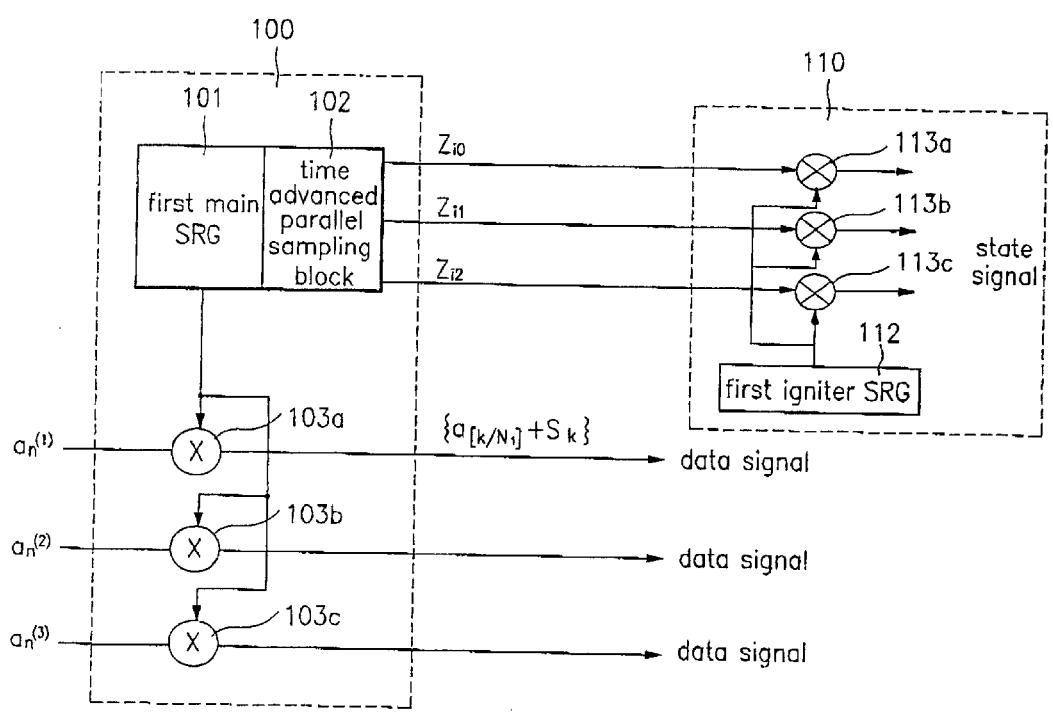
FIG. 9a is a block diagram illustrating the structure of the transmitter of the PDSA system according to a second embodiment of the present invention.
Figure 9B:
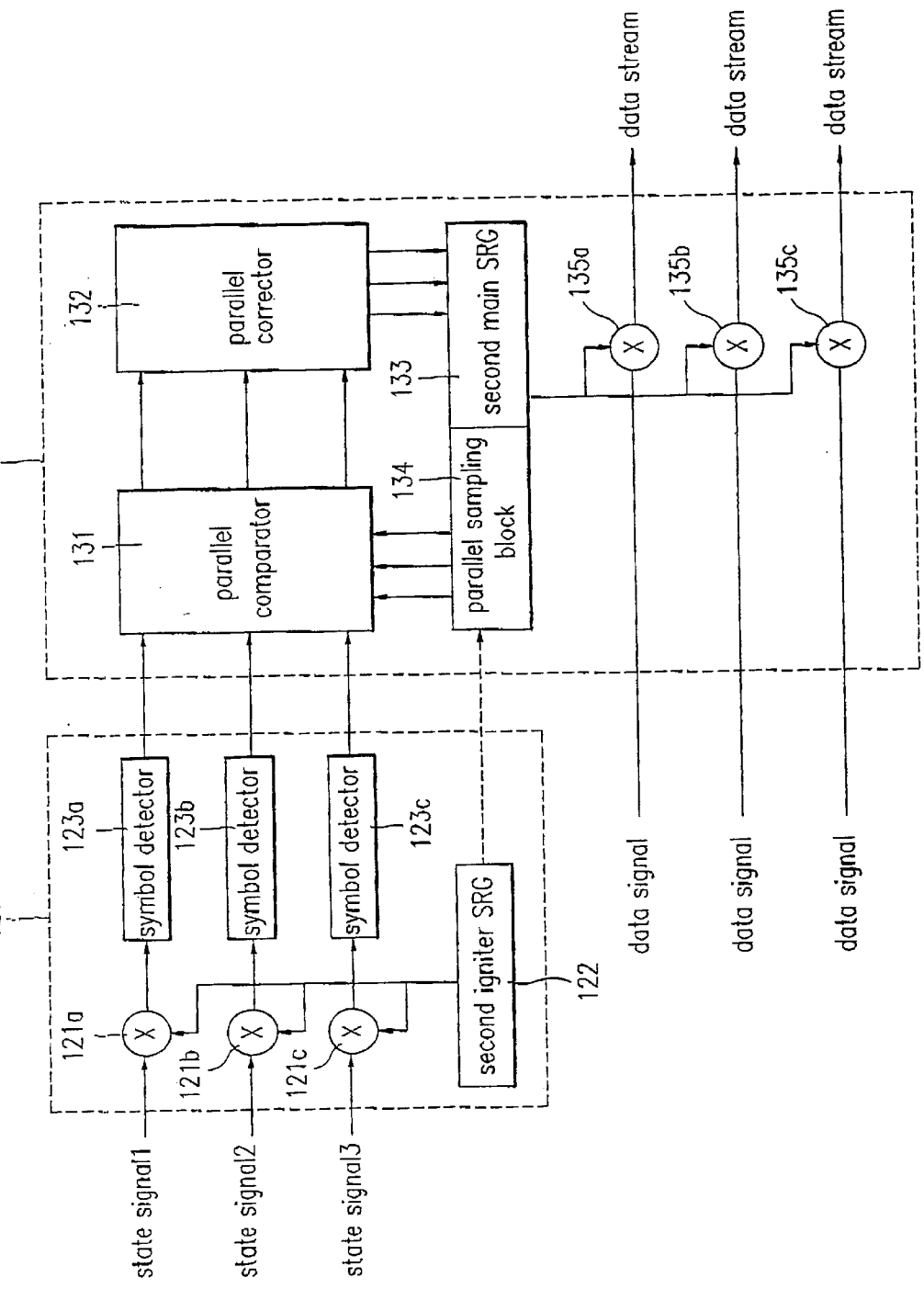
FIG. 9b is a block diagram illustrating the structure of the receiver of the PDSA system according to the second embodiment of the present invention.

FIG. 9a is a block diagram illustrating the structure of the transmitter of the PDSA system according to a second preferred embodiment of the present invention and FIG. 9b is a block diagram illustrating the structure of the receiver of the PDSA system according to the second preferred embodiment of the present invention.

As shown in FIG. 9a, the transmitter of the PDSA system includes a PDSA spreader 100, which takes a plurality of first state samples corresponding to user data from a first main sequence for data spreading. The PDSA spreader 100 spreads a plurality of user data using the first main sequence, thereby outputting a plurality of data signals. It also includes a parallel sample spreader 110, which parallel-spreads the plurality of first state samples outputted from the PDSA spreader 100 to a plurality of binary symbols by a first igniter sequence, thereby transmitting them as a plurality of state signals.

As shown in FIG. 9b, the receiver of the PDSA system includes a parallel sample despreader 120 which acquires the corresponding igniter sequence of each state signal outputted from the transmitter and despreads each state signal. It does so by using the acquired igniter sequence, thereby detecting each first state sample conveyed from the transmitter. It further includes a PDSA despreader 130 which compares the plurality of first state samples detected by the parallel sample despreader 120 with a plurality of second state samples taken from a second main sequence and corrects the state of the second main sequence in accordance with the compared result, thereby despreading the plurality of data signals outputted from the transmitter.

As further shown in FIG. 9a, the PDSA spreader 100 of the transmitter includes a first main SRG 101, which generates the main sequence, and a time-advanced sampling block 102, which takes the plurality of b state samples of the main sequence generated in the first main SRG 101 in advance. It further includes a plurality of spreaders 103a, 103b and 103c which multiply the plurality of user data by the main sequence generated in the first main SRG 101 to spread the multiplied result, thereby outputting it as the data signal. In this case, the time-advanced parallel sampling block 102 has b circuits in order to take the b state samples from the first main SRG 101.

The parallel sample spreader 110 includes a first igniter SRG 112, which generates the igniter sequence carrying the state samples of the main SRG of length L for a fast acquisition of the main sequence to the receiver, and a plurality of spreaders 113a, 113b and 113c, which multiply the b state symbols taken in the time-advanced parallel sampling block 102 by the igniter sequence generated in the first igniter SRG 112 to parallel-spread the b binary symbols, thereby outputting the plurality of state signals corresponding to the user data.

As shown in FIG. 9b, the parallel sample despreader 120 in the receiver includes a second igniter SRG 122, which acquires the igniter sequences of the plurality of state signals conveyed in the transmitter to generate its own igniter sequences for despreading the state signals. It further includes a plurality of despreaders 121a, 121b, and 121c, which despread the plurality of state signals conveyed in the transmitter, using the igniter sequences generated in the second igniter SRG 122, and a plurality of state sampled detectors 123a, 123b and 123c which detect the plurality of state samples conveyed in the transmitter from the state signals.

The PDSA despreader 130 of the receiver includes a second main SRG 133, which generates the main sequence, a parallel sampling block 134, which takes each state sample from the second main SRG 133, a parallel comparator 131, which compares the state samples detected from the state sample detectors 123a, 123b and 123c with the state samples sampled in the parallel sampling block 134, and a parallel corrector 132, which corrects the second main SRG 133 in accordance with the compared result of the parallel comparator 131. It also includes a plurality of despreaders 135a, 135b, and 135c, which despread the plurality of user data signals outputted from the PDSA spreader 100, using the main sequence generated in the second main SRG 133 to output a plurality of data streams. In this case, the second igniter SRG 122 provides the reference point of the timing for the sampling and correction for the second main SRG 133.

The transmitter and receiver of the PDSA system according to the second preferred embodiment of the present invention are the same as those in the first embodiment of the present invention, but may be applied to the multi-carrier CDMA system, which sends the b binary symbols through b parallel branches, instead of mapping b bits to $M=2^b$(b square of 2)-ary symbol.

A PDSA system according to the preferred embodiments of the present invention and a signal acquisition method using the same have many advantages. For example, the transmitter can take a plurality of state samples at the same time for the main sequence to convey them in the M-ary symbols. Also, the receiver can increase the period of igniter sequence without any decrease of the system efficiency, such that the acquisition performance of the igniter sequence can be drastically improved. Thus, the amount of collisions among a plurality of users can be reduced. Moreover, the PDSA system according to these embodiments enables the reuse of the M-ary modem, allowing for the data signal transmission in the ad hoc communication systems for the purpose of transmitting the state signal, thereby improving the efficiency of system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A parallel distributed sample acquisition (PDSA) system comprising:

a transmitter to simultaneously acquire at least one first state sample from a first main sequence for data spreading, mapping the first state sample to a M-ary symbol, and to spread and transmit the M-ary symbol by a first igniter sequence; and a receiver to receive and despread the M-ary symbol by a second igniter sequence, compare the first state sample with a second state sample taken from a second main sequence for data despreading, and synchronize the first main sequence with the second main sequence corrected in accordance with the compared result.

2. The system of claim 1, wherein said transmitter comprises:

a PDSA spreader, which receives the at least one first state sample from the first main sequence and spreads user data, using the first main sequence to output a data signal; and a parallel sample spreader, which inputs the first state sample outputted from said PDSA spreader to generate the M-ary symbol and spreads the generated M-ary symbol by the first igniter sequence, thereby conveying the M-ary symbol state signal.

3. The system of claim 2, wherein said PDSA spreader comprises:

a first main shift register generator (SRG), which generates the first main sequence;

a time-advanced parallel sampling circuit, which takes a prescribed number of state samples of the main sequence generated in said first main SRG in advance; and a spreader, which multiplies the user data by the main sequence generated in said first main SRG to generate the data signal.

4. The system of claim 3, wherein said time-advanced parallel sampling circuit takes the state samples simultaneously at time $(R+i-1)N_I$ in advance, where the period of the generated igniter sequence is $N_I$ and the reference time is R.

5. The system of claim 2, wherein said parallel sample spreader comprises:

a symbol generator to map a prescribed number of state samples taken by said PDSA spreader to a corresponding $2^b$-ary symbol, wherein b is a prescribed number of state symbols;

a first igniter shift register generator (SRG) to generate the first igniter sequence carrying the state samples of the main sequence of length L for a fast acquisition of the main sequence to said receiver; and a spreader to multiply the $2^b$-ary symbol generated in said symbol generator by the igniter sequence generated in said first igniter sequence, thereby outputting the state signal.

6. The system of claim 1, wherein said receiver comprises:

a parallel sample despreader, which acquires a corresponding igniter sequence of the state signal outputted from said transmitter and despreader the received state signal, using the acquired igniter sequence to detect the first received state sample transmitted by said transmitter; and a PDSA despreader, which compares a second state sample taken from the second main sequence with the first state sample from said parallel sample despreader and corrects the state of the second main sequence in accordance with the compared result to despread data received from said transmitter.

7. The system of claim 6, wherein said parallel sample despreader comprises:

a receiver igniter shift register generator (SRG) to acquire the igniter sequence of the received state signal transmitted by said transmitter to generate a receiver igniter sequence to despread the received state signal;

a despreader to despread the received state signal, using the receiver igniter sequence; and a state sample detector to detect the received state samples from the despread state signal.

8. The system of claim 6, wherein said PDSA despreader comprises:

a receiver main SRG to generate the main sequence;

a parallel sampling block to take the received state samples from said receiver main SRG:

a parallel comparator to compare the received state samples detected from said state sample detector with the state samples taken in said parallel sampling block;

a parallel corrector to correct the state of the receiver main SRG in accordance with the compared result of said parallel comparator; and a despreader to despread the data signal outputted from said transmitter, using the main sequence generated in the receiver main SRG, thereby outputting the data stream.

9. A parallel distributed sample acquisition (PDSA) system, comprising:

a transmitter, which extracts a plurality of first state samples from a first main sequence, maps the first state samples to a plurality of $2^b$-ary symbol state signals, spreads and transmits the plurality of $2^b$-ary symbol state signals by a first igniter sequence, and spreads and transmits data by the first main sequence; and a receiver, which receives and despreads the plurality of $2^b$-ary symbol state signals by a second igniter sequence, compares the plurality of $2^b$-ary symbol state signals with a plurality of second state samples from a second main sequence, and despreads the data by the second main sequence corrected in accordance with the compared result.

10. The system of claim 9, wherein said transmitter comprises:

a PDSA spreader to take the plurality of first state samples corresponding to the data from the main sequence for data spreading and to spread the plurality of data, using the main sequence, thereby outputting a plurality of data signals; and a parallel sample spreader to parallel-spread the plurality of first state samples outputted from said PDSA spreader to the plurality of $2^b$-ary symbols by the first igniter sequence, thereby transmitting them as a plurality of state signals.

11. The system of claim 10, wherein said PDSA spreader comprises:

a first main shift register generator (SRG) to generate the main sequence;

a time-advanced sampling circuit to take the plurality of state samples of the main sequence generated in said first main SRG in advance; and a plurality of spreaders to multiply the plurality of data by the main sequence generated in said first main SRG to spread the multiplied results, thereby outputting the data signals.

12. The system of claim 10, wherein said parallel sample spreader comprises:

a first igniter shift register generator (SRG) to generate the igniter sequence carrying the state samples of a main SRG of length L for acquisition of the main sequence to said receiver; and a plurality of spreaders to multiply the plurality of state symbols taken in said PDSA spreader by the igniter sequence generated in said first igniter SRG to parallel-spread the plurality of $2^b$-ary symbols, thereby outputting the plurality of state signals.

13. The system of claim 9, wherein said receiver comprises:

a parallel sample despreader to acquire the corresponding igniter sequence of each state signal outputted from said transmitter and to despread each state signal, using the acquired igniter sequence to detect each first state sample transmitted from said transmitter; and a PDSA despreader to compare the plurality of first state samples detected by said parallel sample despreader wvith the plurality of second state samples taken from the second main sequence to correct the state of the second main sequence in accordance with the compared result, thereby despreading the plurality of data signals outputted from said transmitter.

14. The system of claim 13, wherein said parallel samples despreader comprises:

a receiver igniter shift register generator (SRG) to acquire the igniter sequences of the plurality of state signals transmitted by the transmitter to generate receiver igniter sequences for despreading the state signals;

a plurality of despreaders to despread the plurality of state signals transmitted by said transmitter, using the receiver igniter sequences; and a plurality of state sample detectors to detect the plurality of state samples transmitted by said transmitter from the despread state signals.

15. The system of claim 13, wherein said PDSA despreader comprises:

a receiver main shift register generator (SRG) to generate the main sequence;

a parallel sampling block to take each state sample from said receiver main SRG;

a parallel comparator to compare the state samples detected from said parallel sample despreader with the state samples taken in said parallel sampling block;

a parallel corrector to correct the state of said receiver main SRG in accordance with the compared result of said parallel comparator; and a plurality of despreaders to despread the plurality of user data signals outputted from said transmitter, using the main sequence generated in said receiver main SRG to output the plurality of data streams.

16. A signal acquisition method using a parallel distributed sample acquisition system, comprising:

taking at least one state sample from a first main sequence for data spreading simultaneously every state symbol period;

mapping each state sample to a plurality of $2^b$-ary state symbols;

spreading and transmitting the mapped each state symbol by a first igniter sequence;

synchronizing the first igniter sequence with a second igniter sequence;

dispreading a received signal to output the mapped each state symbol by the second igniter sequence;

detecting the state sample from the mapped each state symbol;

comparing the detected state sample with each state sample taken from a second main sequence; and correcting the state of the second main sequence to synchronize the second main sequence to the first main sequence.

17. The method of claim 16, wherein in the mapping step, said transmitter maps each state sample taken from the first main sequence into one symbol out of $2^b$ symbols every the igniter sequence period and in the spreading step said transmitter spreads the mapped each state sample, using the igniter sequence of one period.

18. The method of claim 16, wherein the state sample comparing step, said receiver takes the state samples having the same number as said transmitter simultaneously from the second main sequence and compares the detected state sample and each state sample taken from the second main sequence.

19. The method of claim 16, further comprising spreading user data, using the first main sequence in said transmitter; and despreading the data signal outputted from said transmitter, using the second main sequence and outputting data stream in said receiver.

20. A signal acquisition method using a parallel distributed sample acquisition system, comprising:

taking a plurality of state samples from a first main sequence for data spreading;

mapping each of the state samples to a plurality of binary symbols;

spreading and transmitting the plurality of binary symbols by a first igniter sequence;

synchronizing the first igniter sequence with a second igniter sequence;

despreading a received signal to output the plurality of binary symbols by the second igniter sequence;

detecting each state sample of the first main sequence from the plurality of binary symbols;

comparing the detected each state sample with each state sample taken from a second main sequence for data despreading; and correcting the state of the second main sequence to synchronize the first main sequence.

21. The method of claim 20, wherein said spreading step further comprises spreading a plurality of user data, using the first main sequence, thereby outputting the user data.

22. The system of claim 1, wherein the M-ary symbol is one of a binary, quaternary, or 64-ary symbol.

23. The system of claim 5, wherein M is equal to $2^b$.

24. The system of claim 9, where b=1, making this state signals binary symbols state signals.

25. A method of receiving a signal in a mobile communication system, comprising:

receiving and despreading a state symbol of a first sequence by a second sequence;

detecting sample state bits of the first sequence from the despread state symbol;

comparing the detected sample sate bits with sample state bits of a third sequence; and receiving and despreading data by the third sequence corrected according to the compared result.

26. The method of claim 25, wherein the state symbol is generated by mapping sample state bits of the third sequence to a corresponding M-ary symbol.

* * * * *